United States Patent [19]
Focke et al.

[11] 4,220,847
[45] Sep. 2, 1980

[54] APPARATUS FOR THERMAL SEALING THE ENDS OF A STACK OF FOIL WRAPPED PACKAGES

[75] Inventors: Heinz Focke; Kurt Liedtke, both of Verden, Fed. Rep. of Germany

[73] Assignee: Focke & Pfuhl, Verden, Fed. Rep. of Germany

[21] Appl. No.: 792,367

[22] Filed: Apr. 29, 1977

[30] Foreign Application Priority Data
May 26, 1976 [DE] Fed. Rep. of Germany ....... 2623598

[51] Int. Cl.² .................... H05B 1/00; B30B 15/34; B65B 51/14
[52] U.S. Cl. .................................. 219/388; 53/388; 53/463; 156/538; 156/583.2; 156/583.4; 219/228; 219/243; 219/258; 219/347; 219/352
[58] Field of Search ............ 219/228, 243, 346, 347, 219/354, 461, 258, 228, 243, 352, 354, 388; 156/580, 583, 538, 583.1, 583.2, 583.4; 53/373, 375, 379, 388, 463, 477–479

[56] References Cited
U.S. PATENT DOCUMENTS

| | | | |
|---|---|---|---|
| 1,708,079 | 4/1929 | Brewer | 219/258 X |
| 1,954,128 | 4/1934 | Heyroth | 219/461 |
| 2,222,327 | 11/1940 | Walkup | 219/245 |
| 2,397,236 | 3/1946 | Boyd | 219/245 X |
| 2,403,115 | 7/1946 | Olving | 219/258 X |
| 3,098,922 | 7/1963 | Paxton | 219/258 X |
| 3,472,721 | 10/1969 | Abramson et al. | 219/349 X |
| 3,509,317 | 4/1970 | Valsamakis et al. | 219/228 X |
| 3,521,031 | 7/1970 | Wahle | 53/463 X |
| 3,533,352 | 10/1970 | Miller | 156/583 X |
| 3,543,002 | 11/1970 | Poole | 219/347 X |
| 4,029,935 | 6/1977 | Archer et al. | 219/228 |

FOREIGN PATENT DOCUMENTS

| | | | |
|---|---|---|---|
| 46-36447 | 10/1971 | Japan | 219/228 |
| 513279 | 10/1939 | United Kingdom | 219/243 |
| 970283 | 9/1964 | United Kingdom | 219/228 |

*Primary Examiner*—A. Bartis
*Attorney, Agent, or Firm*—Sughrue, Rothwell, Mion, Zinn and Macpeak

[57] ABSTRACT

An apparatus for thermal sealing and bonding the ends of foil wrapped cigarette packages includes a conveyor for transporting a stack of packages through a heat sealing station having heat sealing units arranged on opposite sides of the path of travel of the conveyor for simultaneously heat sealing the ends of the packages. Each heat sealing unit includes a plurality of thin superposed spaced heating strips equal in number to the packages in the stack and mounted in a housing for unitary movement into contact with the ends of the stacked packages. The strips have a low thermal inertia and are made of a metal having a high heat conductivity. The housing encloses a plurality of infrared radiators, one for each strip, spaced from the side of the strips opposite the side of adapted to contact the package ends for heating the strips by radiant heat in a contact free manner. The radiators are fixedly mounted independently of the housing and the housing is supported for selective movement relative to the fixedly mounted radiators to bring the heating strips into and out of contact with the package ends.

3 Claims, 3 Drawing Figures

APPARATUS FOR THERMAL SEALING THE ENDS OF A STACK OF FOIL WRAPPED PACKAGES

BACKGROUND OF THE INVENTION

1. Field of the Invention

The present invention relates to a device for sealing or bonding foils, more particularly, packet wrappings, preferably cigarette packet wrappings, through contact transfer of heat to the parts of the foil to be activated.

2. Description of the Prior Art

Cigarette packets are generally provided with an outer wrapping of cellophane or plastic foil, for example, polypropylene foil. The overlapping parts of this outer wrapping are connected together or sealed by the application of heat. Superposed closing flaps are produced in the end zones of the pack by suitably folding the wrapping. These closing flaps can be thermally bonded together or sealed.

The bonding devices used hitherto are in the main equipped with heatable bonding dies. These consist of a relatively large, bulky block which is heated in a suitable manner, generally by so-called heating bars. These heating bars are displaced until they rest on the end faces of the cigarette packets. Bonding is effected by heat transfer.

Bonding dies constructed as defined above can only be controlled to a limited extent in terms of the bonding duration, more specifically, in terms of the length of the heat transferral to the foil to be bonded, this control being limited to displacement of the bonding dies. However, the requisite, resp., optimum bonding period is variable in the case of these packets. It frequently differs from the duration of a machine stroke and thus the bonding dies cannot rest on the packet during the entire period during which the packet is stationary. For the reasons cited, precise adjustments of the length of the bonding operation are both difficult and costly in the case of existing bonding dies of the type defined above.

SUMMARY OF THE INVENTION

The object of the present invention is to provide a device for sealing or bonding foils which allows for accurate, variable control of the bonding time and straightforward operation. The device should also possess a simple structure and have relatively few movable mechanical parts.

The solution to this problem according to the invention consists in that the contact heat is transferred by small, heat-conducting heating elements which are, in turn, heated in a contact-free manner. According to the invention these heating elements preferably consist of thin-walled heating strips made of aluminum sheating or the like. These heating strips are heated by means of heat radiating elements, more particularly, infra-red emitters.

The heat transmitted to the thin-walled heating strips by the infra-red emitters is transferred directly by contact to the foil, resp., packet to be bonded. The infra-red emitters constituting the actual heat source are readily controllable. According to the invention, the temperature of the infra-red emitters is controlled in such a way that the requisite bonding temperature determined according to a machine work cycle, the nature of the foil, etc., is transmitted during the period in which the heating strips rest on the packet. The infra-red emitters are preferably controlled directly by the packaging machine. If there is a variation in the length of the machine cycle, and thus in the amount of time for which the heating strips are applied on the packets, the temperature of the infra-red emitters is adjusted accordingly by varying the voltage or the like.

Heat sealing units are arranged on opposite sides of the path of travel of a conveyor supporting a stack of packages whose ends face the sealing units. Each unit includes heating strips of thin high heat conductivity metal mounted in a housing for unitary movement into contact with the ends of the stacked packages. The housing encloses a plurality of infrared heat radiators, one for each strip. The infrared heat radiators are fixedly mounted independently of the housing and are spaced from the side of the heating strips opposite the side adapted to contact the package ends to heat the strips by radiant heat. Means are provided for selectively moving the housing relative to the fixedly mounted infrared heat radiators to bring the heating strips into and out of contact with the package ends.

Paramount features of the invention relate to the configuration of the heating strips, their mounting in a housing and the configuration and disposition of the heating, resp., infra-red emitters.

Other objects, features and advantages of the present invention will be made apparent in the following description thereof which is provided with reference to the accompanying drawings.

DESCRIPTION OF THE PREFERRED EMBODIMENT

Figure 1:
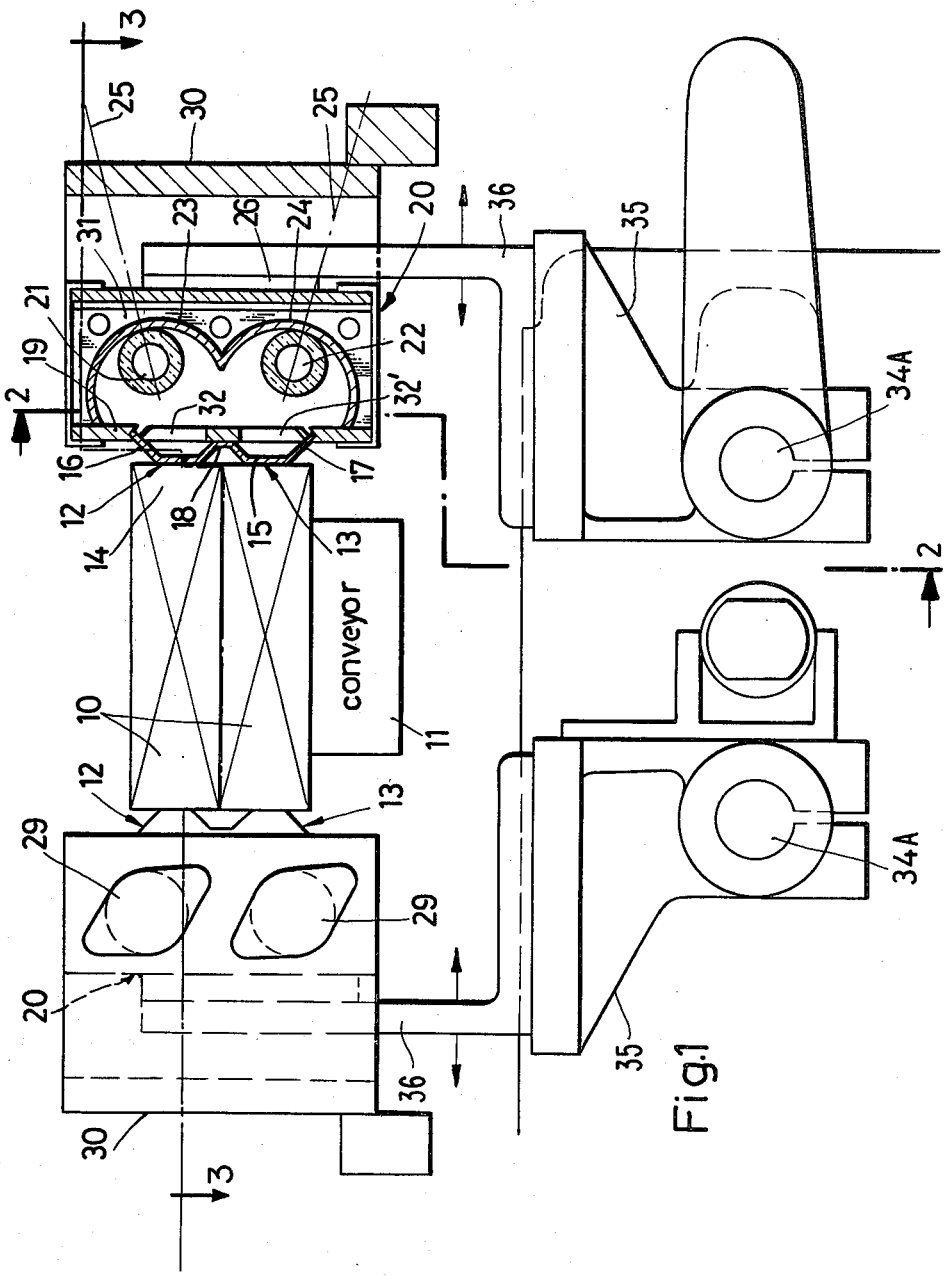
FIG. 1 is a cross-sectional/front end view of a device for sealing the end faces of cigarette packets along the lines 1—1 in FIG. 3
Figure 2:
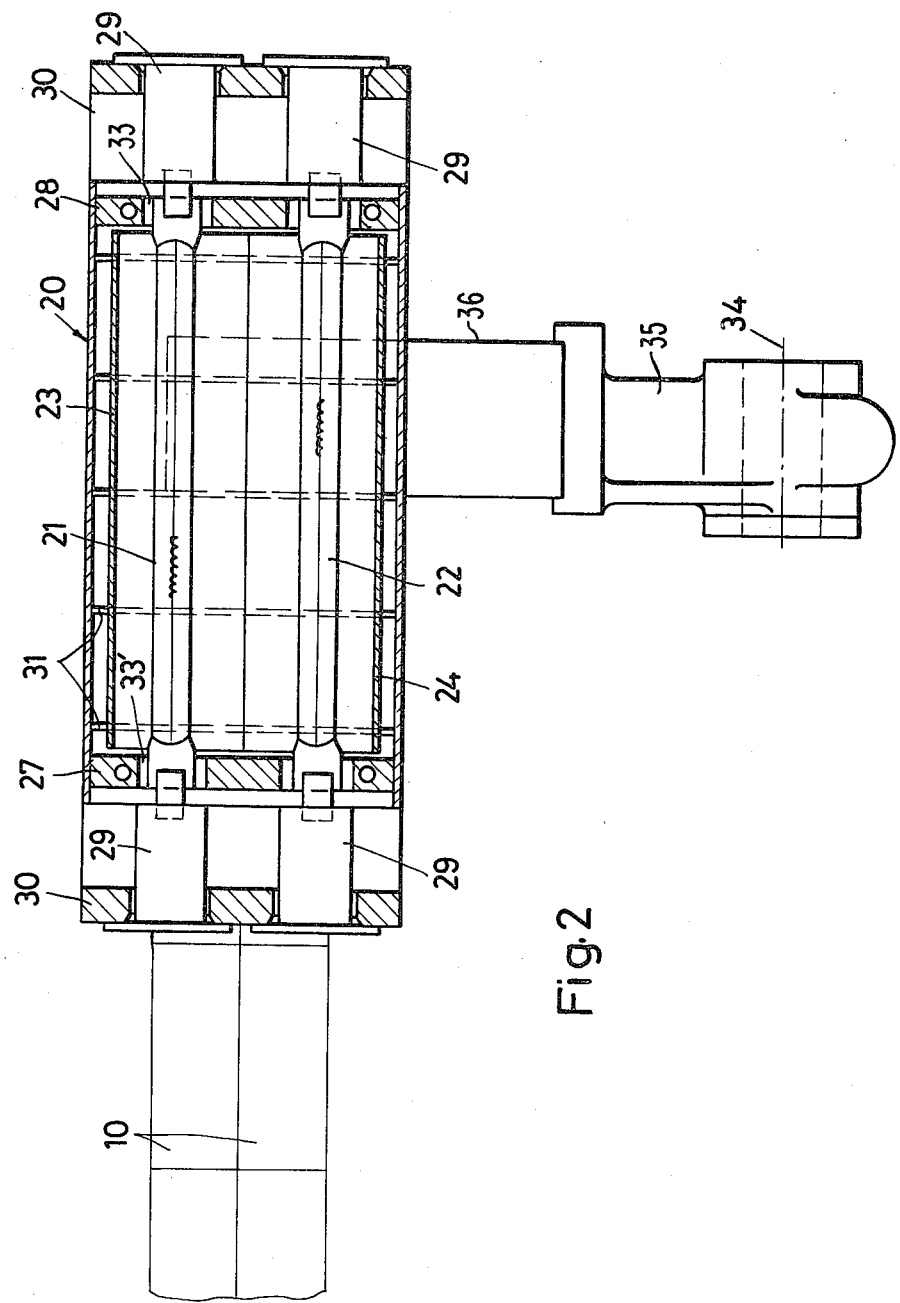
FIG. 2 is a longitudinal section along the lines 2—2 in FIG. 1, partially in elevation.
Figure 3:
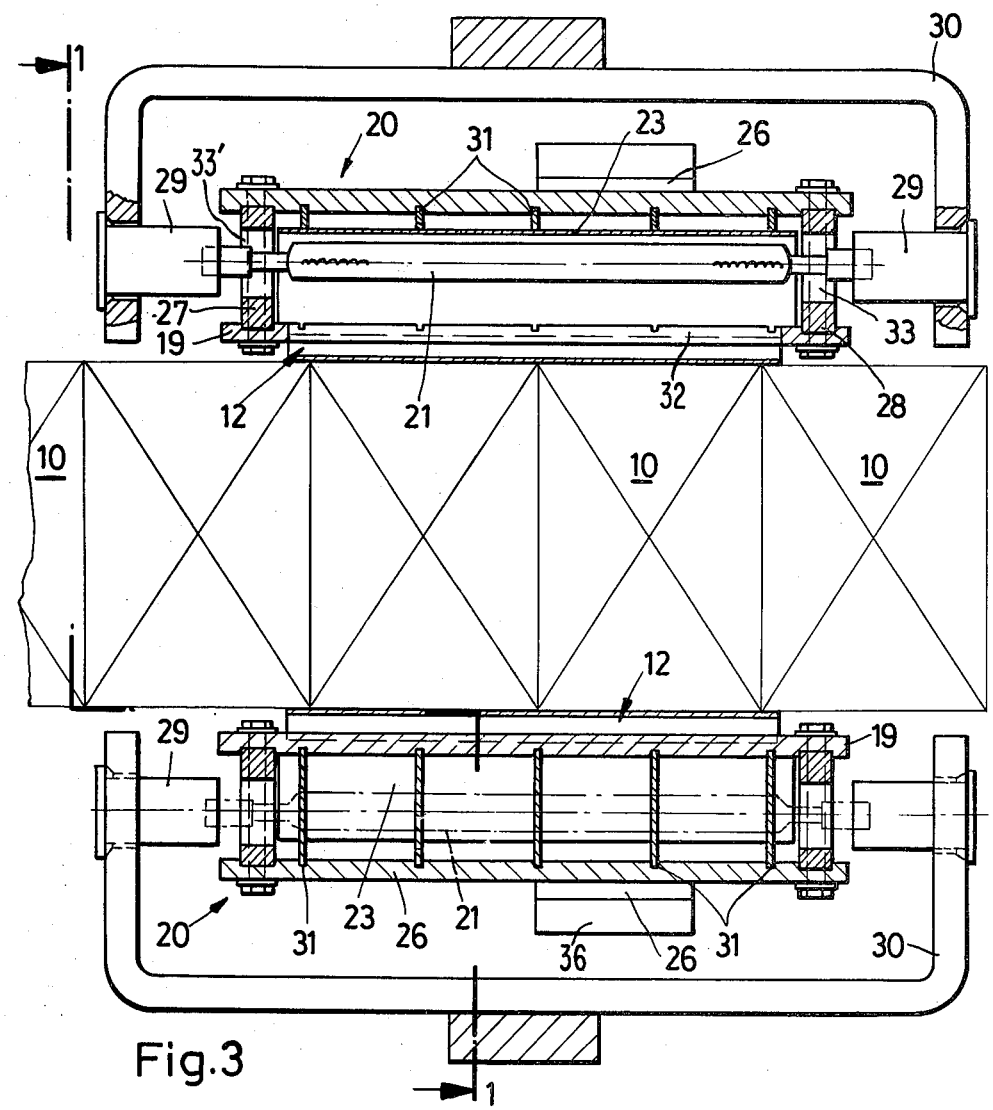
FIG. 3 is a partial plan view of a horizontal section along the lines 3—3 in FIG. 1.

The device shown in the drawings is designed for sealing cigarette packets 10. The cigarette packets 10 are supplied to a sealing station in superposed pairs on a suitable conveyor 11. The object is to bond or seal an outer cellophane or plastic foil wrapping for the cigarette packets 10 in the region of the top and bottom end faces by the transfer of heat.

Heating strips 12 and 13 extending in the direction of travel are provided for this purpose on each side of the conveying path for the cigarette packets 10, i.e., on each side of the conveyor 11. The heating strips 12 and 13 are so mounted with respect to the conveyor 11, and thus with respect to the cigarette packets 10, that contact faces 14 and 15 thereof rest against the corresponding end faces of the cigarette packets 10. Heat is transferred by contact to the cigarette packets 10.

The heating strips 12 and 13 are narrow and are made of a material having good heat conducting properties. These heating strips 12 and 13 preferably consist of thin aluminum sheeting having a thickness of 0.3–0.5 mm. This configuration of the heating strips ensures rapid heat transfer to the relevant faces of the cigarette packets 10. The heat conserving properties of these transfer elements is minimal. If the heat supply system of these strips 12 and 13, which will be described in more detail hereinafter, is interrupted, the temperature of the heating strips 12, 13 immediately drops beneath the bonding temperature.

The superposed heating strips 12 and 13 according to the invention consist of a workpiece, namely a formed metal strip which is bent to form outer arms 16 and 17 and a median web 18. The heating strips 12 and 13 are mounted on and secured to the arms 16 and 17. The arms 16 and 17 are, in turn, inserted in slots provided in the front wall 19 of a housing 20 forming a support. The web 18 between the heating strips 12 and 13 is disposed adjacent to the front side of the housing 20.

The heating strips 12 and 13 are heated in a contact-free manner by heat radiators, more particularly, infra-red emitters 21 and 22. The infra-red emitters 21 and 22 are disposed in the housing 20. They extend over the length of a plurality of cigarette packets, for example, two cigarette packet lengths. Each heating strip 12, 13 is associated with an infra-red emitter 21, 22. The faces of the heating strips 12 and 13 turned toward the infra-red emitters 21 and 22 are dark, more specifically, black, thereby enabling them to temporarily absorb the heat transmitted by radiation and conduct this heat.

Reflectors 23 and 24 are provided for the infra-red emitters 21 and 22. The reflectors 23 and 24 have an arcuate cross-section and are so arranged that their optical axis 25, resp., their optical plane, passes centrally through the respective heating strip associated therewith.

The housing 20 consists of the above-mentioned front wall 19, a rear wall 26 and side walls 27 and 28. The infra-red emitters 21 and 22 project at the end of the housing 20 by way of trunnions 29. The trunnions 29 are mounted in a separate bow-shaped holder 30. The passage through the side walls 27 and 28 of the housing 20 is in the region of the large recesses 33 and 33'. The infra-red emitters 21 and 22 are thus rigidly mounted independently of the housing 20.

In contrast, the reflectors 23 and 24 are rigidly connected to the housing. Spaced-apart supporting plates 31 are mounted for this purpose on the rear wall 26 of the housing. The supporting plates, which are disposed, for example, in slots, are provided on their sides facing towards the reflectors 23 and 24 with contours corresponding to the cross-section of the reflectors. As a result, these can be disposed in a form-locking manner adjacent to the supporting plates 31.

Slot recesses 32 and 32' are provided in the front wall 19 of the housing 20 at the level of the heating strips 12 and 13. The radiated heat passes through these slots to the rear side of the heating slots.

Each housing 20 is displaceably mounted, more specifically, it is pivotable about an axis 34 via arms 36 and base 35. The housing 20 disposed on each side of the cigarette packets 10 can be pivoted about the axis 34 and swing away from or toward the cigarette packets 10. When the housing 20 is pivoted away from the conveyor 11, the cigarette packets 10 are advanced. Owing to their special mounting position, the infra-red emitters 21 and 22 do not participate in the afore-mentioned movements.

What is claimed is:

1. An apparatus for thermal sealing and bonding of foil wrapping of cigarette packages comprising:
    a conveyor for transporting stacked packages through a heat sealing station, said heat sealing station having heat sealing units arranged on opposite sides of the path of travel of the conveyor of simultaneously heat sealing the ends of a stack of packages,
    each heat sealing unit including a plurality of superposed spaced heating strips equal in number to the packages in the stack and arranged so that each strip can be brought into contact with the end of a different one of the packages in the stack,
    said heating strips being made of thin, high heat conductivity metal and having a low thermal inerita,
    means for mounting said strips in a housing for unitary movement into contact with the ends of said packages, said housing enclosing a plurality of infrared heat radiators, one for each strip, spaced from the side of said strips opposite the side adapted to contact the package ends for heating said strips by radiant heat in a contact free manner,
    said housing being mounted for selectively moving said heating strips into and out of contact with the package ends, and
    means for independently fixedly mounting said heat radiators relative to said movable heating strips and said housing such that said housing an said heating strips are movable as a unit relative to said fixedly mounted radiators for bringing said strips into and out of contact with the pcakge ends.

2. The apparatus as claimed in claim 1, wherein said plurality of heating strips are formed from one sheet metal work piece and additionally form the side of the housing which faces said packages.

3. The apparatus as claimed in claim 2, wherein said heating strips have offset longitudinal edges and further comprise legs inclined to the side of said housing which faces said packages, and said legs are fitted to correspondingly inclined slits within said side of said housing.

* * * * *